United States Patent Office 3,092,621
Patented June 4, 1963

3,092,621
2-AMINO-METHYL ANDROSTANO DERIVATIVES
George De Stevens, New Providence, N.J., assignor to Ciba Corporation, a corporation of Delaware
No Drawing. Filed Mar. 6, 1961, Ser. No. 93,300
20 Claims. (Cl. 260—239.5)

The present invention relates to 2β-halogeno-2α-tertiary amino-methyl-androstane compounds, especially those of the formula:

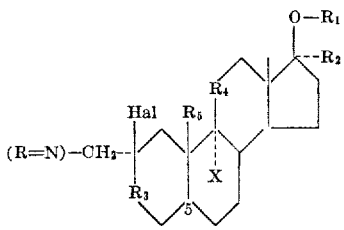

in which $R_1$ represents hydrogen or the acyl radical of an organic acid, $R_2$ stands for hydrogen or lower aliphatic hydrocarbon, $R_3$ represents carbonyl, functionally converted carbonyl, hydroxy-methylene or functionally converted hydroxy-methylene, $R_4$ represents methylene, carbonyl, hydroxy-methylene or functionally converted hydroxy-methylene, $R_5$ stands for hydrogen or methyl, X represents hydrogen or halogeno, (R=N)— represents tertiary amino, and Hal stands for halogeno, especially bromo, and in which the hydrogen atom attached to the 5-position has preferably the α-configuration, salts or quaternary ammonium compounds thereof, as well as procedure for the preparation of such compounds.

The acyl radical of an organic acid represented, for example, by the group $R_1$ in the above formula, is particularly the acyl radical of an organic carboxylic, as well as of an organic sulfonic acid, which contains preferably from one to twelve carbon atoms. Such acids are, for example, alkanoic acids, e.g. acetic, proprionic, n-butyric, n-valeric, trimethylacetic, caproic, heptanoic, caprylic, pelargonic, capric, undecylic, lauric acid and the like, alkenoic acids, e.g. 3-butenoic, undecylenic acid and the like, cycloalkyl-alkanoic acids, e.g. cyclopentylpropionic, cyclohexylacetic, cyclopropylpropionic acid and the like, alkane dicarboxylic acids, e.g. oxalic, malonic, succinic, glutaric acid and the like, alkene dicarboxylic acids, e.g. maleic, fumaric acid and the like, carbocyclic aryl carboxylic acids, e.g. benzoic, naphthoic acid and the like, carbocyclic aryl-alkanoic acids, e.g. phenylacetic, 3-phenylpropionic acid and the like, carbocyclic aryl-alkenoic acids, e.g. cinnamic acid and the like, or any other suitable organic carboxylic acid, as well as organic sulfonic acid, such as methane sulfonic, ethane sulfonic, p-toluene sulfonic acid and the like.

Apart from representing hydrogen, $R_2$ stands for an aliphatic hydrocarbon radical, containing preferably from one to four carbon atoms, such as lower alkyl, e.g. methyl, ethyl, n-propyl, isopropyl, n-butyl, isobutyl and the like, as well as lower alkenyl, e.g. vinyl, allyl, 2-methyl-allyl, 3-methyl-allyl and the like, or lower alkynyl, e.g. ethynyl, 1-propynyl and the like.

The group $R_3$ represents especially carbonyl. It may also stand for functionally converted carbonyl, in which the functionally converted oxo group is represented by lower alkylenedioxy, e.g. ethylenedioxy, 1-2-propylenedioxy, 2,3-butylenedioxy and the like, or any other functionally converted oxo group, as well as for hydroxy-methylene or functionally converted hydroxy-methylene, particularly acylated hydroxy-methylene, in which the acyl radical is derived from an organic carboxylic or sulfonic acid, particularly one of the above-mentioned organic acids.

$R_4$ represents primarily methylene. It may also stand for carbonyl, hydroxy-methylene or functionally converted hydroxy-methylene; these groups are analogous to those described hereinabove.

$R_5$, although it may represent hydrogen, stands especially for methyl.

X is primarily hydrogen; when representing halogeno, especially halogeno with a molecular weight below 80, X is particularly fluoro, but may also stand for chloro or bromo.

The tertiary amino group (R=N)— is represented, for example, by N,N-di-substituted amino, particularly by N,N-di-lower alkyl-amino, e.g. N,N-dimethylamino, N-ethyl-N-methyl-amino, N,N-diethylamino, N,N-di-n-propylamino and the like, N-cycloalkyl-N-lower alkyl-amino, e.g. N - cyclopentyl - N - methyl - amino, N - cyclohexyl-N-ethyl-amino and the like, N-lower alkyl-N-phenyl-lower alkyl-amino, e.g. N-benzyl-N-methyl-amino, N-methyl-N-(2-phenylethyl)-amino and the like, as well as other N,N-di-substituted-amino groups, such as, for example, N-hydroxy-lower alkyl-N-lower alkyl-amino, e.g. N-ethyl-N-(2-hydroxyethyl)-amino and the like, N,N-di-hydroxy-lower alkyl-amino, e.g. N,N-di-(2-hydroxyethyl)-amino and the like. The tertiary amino group is primarily represented by N,N-alkylene-imino, in which alkylene contains from four to six carbon atoms, e.g. 1-pyrrolidino, 1-piperidino, 2-methyl-1-piperidino, 1-hexamethyleneimino and the like. It may also stand for N,N-oxa-alkyleneimino, in which alkylene contains primarily four carbon atoms, e.g. 4-morpholino and the like, N,N-thia-alkylene-imino, in which alkylene contains primarily four carbon atoms, e.g. 1-thiamorpholino and the like, or N,N-aza-alkylene-imino, in which alkylene contains from four to six carbon atoms, and in which the aza-nitrogen atom may be substituted, for example, by lower alkyl, hydroxy-lower alkyl, acyl, carbo-lower alkoxy and the like, e.g. piperazino, 4-methyl-1-piperazino, 4-(2-hydroxyethyl) - 1 - piperazino, 4 - acetyl - 1 - piperazino, 4-carbethoxy-1-piperazino and the like.

Hal in the above formula represents a halogeno atom especially bromo, as well as chloro and the like.

Preferably, the compounds of the present invention are of the androstane series, i.e. compounds, in which the hydrogen atom attached to the 5-position has the α-configuration.

Salts of the above compounds are acid addition salts, particularly those with inorganic acids, e.g. hydrochloric, hydrobromic, sulfuric, nitric, phosphoric acids and the like, as well as with organic acids.

Quaternary ammonium derivatives of the compounds of this invention are particularly those with reactive esters formed by hydroxylated compounds with strong acids; such esters are, for example, lower alkyl halides, e.g. methyl, ethyl, n-propyl or isopropyl chloride, bromide or iodide and the like, phenyl-lower alkyl halides, e.g. benzyl, 1-phenylethyl or 2-phenylethyl chloride, bromide or iodide and the like, di-lower alkyl sulfates, e.g. di-methyl sulfate, diethyl sulfate and the like, lower alkyl lower alkaline sulfonates, e.g. methyl methane sulfonate, methyl ethane sulfonate, ethyl methane sulfonate and the like, lower alkyl aryl sulfonates, e.g. methyl p-toluene sulfonate and the like. Also included as quaternary ammonium compounds are the quaternary ammonium hydroxides, and the salts obtained by reacting such quaternary ammonium hydroxides with inorganic or organic acids.

The compounds of the present invention are valuable intermediates, for example, in the preparation of 2-tertiary amino-methyl-Δ¹-androstene compounds described hereinbelow; the conversion to the latter may be carried out by dehydrohalogenating a 2β-halogeno-2α-tertiary aminomethyl-androstene compound, for example, according to the procedure described hereinbelow. They may also be used as intermediates for the preparation of 4α-halogeno-2α-tertiary amino-methyl-androstane compounds; the latter and their formation will be described hereinbelow.

Particularly useful compounds of this invention are those of the formula:

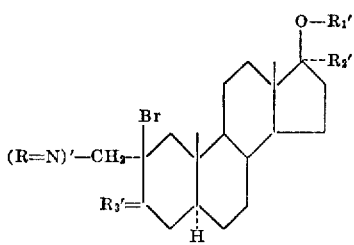

in which $R_1'$ stands for hydrogen or alkanoyl containing from one to twelve carbon atoms, $R_2'$ represents hydrogen or lower alkyl, $R_3'$ stands for oxo or lower alkylenedioxy, and the group $(R=N)'$ — represents N,N-di-lower alkyl-amino or N,N-alkylene-imino, in which alkylene contains from four to six carbon atoms, acid addition salts or lower alkyl quaternary ammonium compounds thereof. This group may be represented by 2β-bromo-2α-(N,N-dimethylaminomethyl)-androstan-17β-ol-3-one,
2β-bromo-2α-(N,N-dimethylaminomethyl)-3,3-ethylenedioxy-androstan-17β-ol,
2β-bromo-2α-(N,N-dimethylaminomethyl)-17-propionyloxy-androstan-3-one,
2β-bromo-2α-(N,N-dimethylaminomethyl)-17α-methyl androstan-17-β-ol-3-one,
2β-bromo-2α-(N,N-diethylaminomethyl)-androstan-17β-ol-3-one,
2β-bromo-2α-(N,N-diethylaminomethyl)-3,3-(1,2-propylenedioxy)-androstan-17β-ol,
2β-bromo-2α-(N,N-diethylaminomethyl)-17α-ethyl-androstan-17β-ol-3-one,
2β-bromo-2α-(N-ethyl-N-methyl-amino-methyl)-17β-trimethylacetyloxy-androstan-3-one,
2β-bromo-2α-(N,N-di-n-propylaminomethyl)-androstan 17β-ol-3-one,
2β-bromo-2α-(1-pyrrolidinomethyl)-androstan-17β-ol-3-one,
2β-bromo-17α-methyl-2α-(1-pyrrolidino-methyl)-androstan-17β-ol-3-one,
2β-bromo-17α-ethyl-2α-(1-pyrrolidino-methyl)-androstan-17β-ol-3-one,
2β-bromo-17β-acetoxy-2α-(1-pyrrolidino-methyl)-androstan-3-one,
2β-bromo-17β-propionyloxy-2α-(1-pyrrolidinomethyl)-androstan-3-one,
2β-bromo-3,3-ethylenedioxy-2α-(1-pyrrolidinomethyl)-androstan-17β-ol,
2β-bromo-3,3-(1,2-propylenedioxy)-2α-(1-pyrrolidinomethyl)-androstan-17β-ol,
2β-bromo-2α-(1-piperidinomethyl)-androstan-17β-ol-3-one,
2β-bromo-17α-methyl-2α-(1-piperidinomethyl)-androstan-17β-ol-3-one,
2β-bromo-3,3-ethylenedioxy-2α-(1-piperidinomethyl)-androstan-17β-ol,
2β-bromo-2α-(N,N-hexamethyleneiminomethyl)-androstan-17β-ol-3-one and the like, as well as, for example, 2β-bromo-2α-(1-pyrrolidinomethyl)-19-nor-androstan-17-ol-3-one, 2β-bromo-2α-(1-pyrrolidinomethyl)-androstan-11β,17β-diol 3-one, 2β-bromo-9α-fluoro-17α-methyl-2α-(1-piperidinomethyl)-androstan-11β,17β-diol-3-one and the like, and acid addition salts of these compounds with inorganic acids, e.g. hydrochloric, sulfuric acid and the like, or organic carboxylic acids, e.g. acetic, tartaric, citric acid and the like, and the lower alkyl quaternary ammonium halides, thereof, such as the methochlorides, methobromides, methiodides, ethochlorides, ethobromides, ethiodides and the like, and the corresponding quaternary ammonium hydroxides.

The compounds of the present invention are prepared by reacting a 2α-tertiary amino-methyl androstan-3-one compound, especially a compound of the formula:

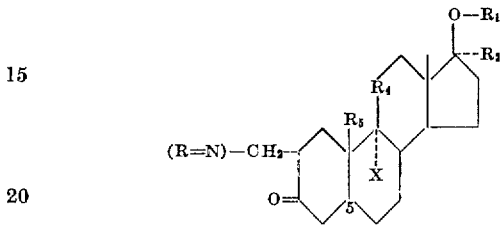

in which $R_1$, $R_2$, $R_4$, $R_5$, X and $(R=N)$ — have the previously given meaning, and in which the hydrogen atom, attached to the 5-position has preferably the α-configuration, a salt or a quaternary ammonium compound thereof with an equivalent amount of halogen, especially bromine, and, if desired, converting a resulting salt into the free compound, and/or, if desired, converting the free base into a salt or a quaternary ammonium compound thereof, and/or, if desired, converting in a resulting compound functional groups into other functional groups.

The introduction of the 2β-halogeno, particularly the 2β-bromo, atom is carried out by treatment with halogen, particularly bromine, under kinetically controlled conditions, i.e. under conditions which favor the rate-controlled product. This can be achieved by reacting the starting material with an equivalent amount of halogen, particularly bromine, in the absence of hydrogen ions. Any hydrohalic acid, particularly hydrobomic acid, generated during the course of the reaction is neutralized, for example, by the starting material having basic properties or by a base such as an alkali metal lower alkanoate, e.g. sodium acetate and the like, which may be added to the reaction medium. The reaction is carried out in the presence of an inert diluent, for example, of a halogenated aliphatic hydrocarbon, e.g. chloroform, carbon tetrachloride and the like, if necessary while cooling.

The 2-tertiary amino-methyl-androstan-3-one compounds used in the preparation of the halogenated intermediates may be manufactured according to known methods, for example, by reacting a 2-unsubstituted androstan-3-one compound with a secondary amine or a salt of such amine, in the presence of formaldehyde or a reactive derivative thereof, or by reacting a 2-hydroxymethylene-androstane compound with a secondary amine and removing in a resulting 2-tertiary amino-methylene-androstane compound the carbon-carbon double bond of the tertiary amino-methylene group in the 2-position, or removing in a 2-tertiary amino-methyl-androstene compound, in which a double bond extends from the 5-position, the carbon-carbon double bond extending from the 5-position, and, if desired, converting a resulting salt into the free base, and/or, if desired, converting a free base into a salt thereof.

The reaction of the androstan-3-one compound with the secondary amine in the presence of formaldehyde is carried out according to the Mannich method; for example, to the steroid starting material there are added the secondary amine, or preferably a salt thereof, and the formaldehyde, the latter, for example, in an aqueous solution, or in the form of a reactive derivative thereof, e.g. para-formaldehyde, trioxane, an acetal with a lower alkanol, such as dimethoxymethane, diethoxymethane and the like. The reaction is carried out in solution; a lower alkanol, e.g. methanol, ethanol and the like, or any other suitable solvent may be used as a diluent.

Treatment of the 2-hydroxymethylene-androstane compound with the amine is preferably carried out in an inert solvent, such as, for example, benzene, toluene and the like, or any other suitable diluent, and at an elevated temperature. The double bond of the 2-tertiary-aminomethylene group may be removed, for example, by treatment with a suitable reducing reagent, such as an alkali metal aluminum hydride, for example, lithium aluminum hydride, sodium aluminum hydride and the like, in the presence of an inert solvent, particularly an ether, e.g. diethyl ether, tetrahydrofuren and the like, and at an elevated temperature, or any other reducing reagent, such as catalytically activated hydrogen or nascent hydrogen.

The removal of the carbon-carbon double bond in a 2α-tertiary amino-methyl-androstene compound, which contains a double bond extending from the 5-position, may be carried out according to known reducing methods, for example, by treating the starting material with lithium in liquid ammonia. The reaction may be carried out in the presence of an inert diluent, particularly an ether, e.g. p-dioxane, diethyl ether and the like, or a mixture of solvents. Other reagents, such as catalytically activated hydrogen or nascent hydrogen may be used as well.

The present invention also relates to 4α-halogeno-2α-tertiary amino-methyl-androstane compounds, especially those of the formula:

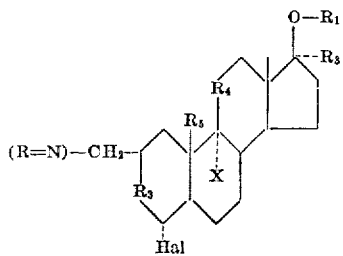

in which $R_1$, $R_2$, $R_3$, $R_4$, $R_5$, X, Hal and (R=N)— have the previously given meaning, and in which the hydrogen atom attached to the 5-position has preferably the α-configuration, salts or quaternary ammonium compounds thereof.

These compounds represent useful intermediates for the formation of 2α-tertiary amino-methyl-androstene compounds, in which a double bond extends from the 5-position to the 4-position or the 6-position; these compounds may be prepared, for example, by dehydrohalogenating a 4α-halogeno-2α-tertiary amino-methyl-androstane compound, according to known methods, for example, according to those described hereinbelow. They may also be used as intermediates in the formation of 2β,4α-dihalogeno-2α-tertiary amino-methyl-androstane compounds; the latter and their preparation will be described hereinbelow.

Particularly useful 4α-halogeno-2α-tertiary amino-methyl-androstane compounds are those of the formula:

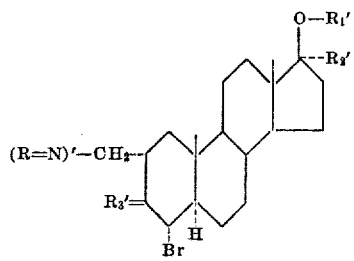

in which $R_1'$, $R_2'$, $R_3'$ and (R=N)'— have the previously given meaning, acid addition salts or lower alkyl quaternary ammonium derivatives thereof. They may be represented for example, by 4α-bromo-2α-(N,N-dimethylaminomethyl)androstan-17β-ol-3-one,
4α-bromo-2α-(N,N-dimethylaminomethyl)-3,3-ethylenedioxy-androstan-17β-ol,
4α-bromo-2α-(N,N-dimethylaminomethyl)-17β-propionyloxy-androstan-3-one,
4α-bromo-2α-(N,N-dimethylaminomethyl)-17α-methyl-androstan-17β-ol-3-one,
4α-bromo-2α-(N,N-diethylaminomethyl)-androstan-17β-ol-3-one,
4α-bromo-2α-(N,N-diethylaminomethyl)-3,3-(1,2-propylene-dioxy)-androstan-17β-ol,
4α-bromo-2α-(N,N-diethylaminomethyl)-17α-ethyl-androstan-17β-ol-3-one,
4α-bromo-2α-(N-ethyl-N-methyl-aminomethyl)-17β-trimethylacetyloxy-androstan-3-one,
4α-bromo-2α-(N,N-di-n-propylaminomethyl)androstan-17β-ol-3-one,
4α-bromo-2α-(1-pyrrolidino-methyl)-androstan-17β-ol-3-one,
4α-bromo-17α-methyl-2α-(1-pyrrolidino-methyl)-androstan-17β-ol-3-one,
4α-bromo-17α-ethyl-2α-(1-pyrrolidino-methyl)-androstan-17β-ol-3-one,
4α-bromo-17β-acetoxy-2α-(1-pyrrolidino-methyl)-androstan-3-one,
4α-bromo-17β-propionyloxy-2α-(1-pyrrolidinomethyl)-androstan-3-one,
4α-bromo-3,3-ethylenedioxy-2α-(1-pyrrolidinomethyl)-androstan-17β-ol,
4α-bromo-3,3-(1,2-propylenedioxy)-2α-(1-pyrrolidino-methyl)-androstan-17β-ol,
4α-bromo-2α-(1-piperidinomethyl)-androstan-17β-ol-3-one,
4α-bromo-17α-methyl-2α-(1-piperindinomethyl)-androstan-17β-ol-3-one,
4α-bromo-3,3-ethylenedioxy-2α-(1-piperindinomethyl)-androstan-17β-ol,
4α-bromo-2α-(N,N-hexamethyleneiminomethyl)-androstan 17β-ol-3-one and the like, as well as, for example, 4α-bromo-2α-(1-pyrrolidinomethyl)-19-nor-androstan-17β-ol-3-one,
4α-bromo-2α-(1-pyrrolidinomethyl)-androstan-11β,17β-diol-3-one,
4α-bromo-9α-fluoro-17α-methyl-2α-(1-piperindinomethyl)-androstan-11β,17β-diol-3-one and the like, and acid addition salts of these compounds with inorganic acids, e.g. hydrochloric, sulfuric acid and the like, or organic carboxylic acids, e.g. acetic, tartaric, citric acid and the like, and the lower alkyl quaternary ammonium halides thereof, such as the methochlorides, methobromides, methiodides, ethochlorides, ethobromides, ethiodides and the like, and the corresponding quaternary ammonium hydroxides.

The 4α-halogeno-2α-tertiary amino-methyl-androstane compounds of this invention may be prepared, for example, by reacting a 2α-tertiary amino-methyl-androstan-3-one compound, especially a compound of the formula:

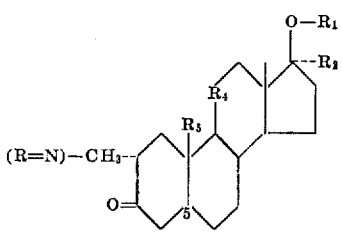

in which $R_1$, $R_2$, $R_4$, $R_5$, X and (R=N)— have the previously-given meaning, and in which the hydrogen atom attached to the 5-position has preferably the α-configuration, a salt or a quaternary ammonium compound thereof, with halogen, particularly with bromine, in the presence of hydrogen ions, and, if desired, carrying out the optional steps.

The above treatment with halogen, primarily bromine, is carried out under thermodynamically controlled or equilibrating conditions, i.e. under conditions which favor the formation of the more stable products. This can be achieved by reacting the starting material with the halogen, particularly bromine, in the presence of hydrogen ions, i.e. in the presence of an acid. An acid, such as an inorganic acid, e.g. hydrobromic, hydrochloric, sulfuric and the like, an organic carboxylic or an organic sulfonic acid, e.g. acetic, p-toluene sulfonic acid and the like, or a mixture of acids, e.g. a mixture of acetic and hydrobromic acid and the like, may be added to the reaction mixture.

The presence of hydrogen ions may also be achieved by reacting an acid addition salt of the starting material with halogen, particularly bromine, which proceeds with the formation of hydrogen halide, particularly hydrogen bromide, which serves as the hydrogen ion source, or by reacting the starting material with an excess of the halogen, especially bromine. The halogenation reaction is carried out in the presence of a suitable solvent; an acid, e.g. acetic acid and the like, which may also serve as the acidic reagent, or an inert diluent, such as halogenated aliphatic hydrocarbon, e.g. carbon tetrachloride, chloroform and the like, may be used as a solvent. The reaction is performed at room temperature or, preferably, while cooling.

The 4α-halogeno-2α-tertiary amino-methyl-androstane compounds may also be prepared by treating a 2β-halogeno-2α-tertiary amino-methyl-androstane compound, particularly a compound of the formula:

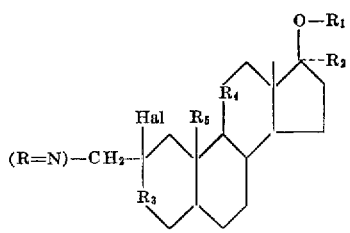

in which $R_1$, $R_2$, $R_3$, $R_4$, $R_5$, X, Hal and (R=N)— have the previously given meaning, or a salt thereof, with an acid, and, if desired, carrying out the optional steps.

The above reaction may be carried out by treating the starting material with an acid, such as, for example, one of the acids present in the previously described halogenation reaction, if necessary, while using an additional diluent, such as one of these previously described, and/or while cooling.

This invention also relates to 2β,4α-di-halogeno-2α-tertiary amino-androstane compounds, particularly those of the formula:

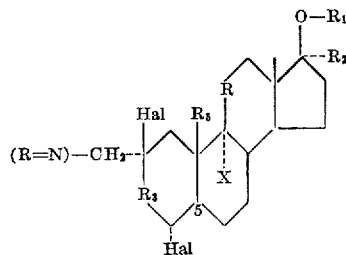

in which $R_1$, $R_2$, $R_3$, $R_4$, $R_5$, X, Hal and (R=N)— have the previously-given meaning, and in which the hydrogen atom attached to the 5-position has preferably the configuration, salts or quaternary ammonium derivatives thereof.

These compounds are useful intermediates in the preparation of 2-tertiary amino-methyl-$\Delta^{1,4}$-androstadiene compounds, salts or quaternary ammonium compounds thereof. These compounds may be prepared according to the dehydrohalogenation procedure described hereinbelow.

Particularly important 2β,4α-di-halogeno-2α-tertiary amino-methyl-androstane compounds of this invention are those of the formula:

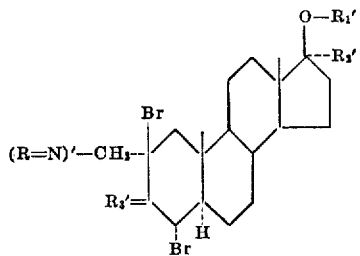

in which $R_1'$, $R_2'$, $R_3'$ and (R=N)'— have the previously-given meaning, acid addition salts or lower alkyl quaternary ammonium compounds thereof. These compounds may be represented, for example, by 2β,4α-dibromo-2α-(N,N-dimethylaminomethyl)-androstan - 17β - ol - 3-one, 2β,4α-dibromo - 2α - (N,N - dimethylaminomethyl)-3,3-ethylene-dioxy-androstan - 17β - ol, 2β,4α-dibromo-(N,N-dimethylaminomethyl) - 17β - propionyloxy-androstan-3-one, 2β,4α-dibromo - 2α - (N,N-dimethylaminomethyl)-17α-methyl-androstan-17β - ol - 3-one, 2β,4α-dibromo-2α-(N,N-diethylaminomethyl)-androstan - 17β - ol - 3 - one, 2β,4α - dibromo - (N,N - diethylaminomethyl)-3,3-(1,2-propylenedioxy)-androstan - 17β - ol, 2β,4α-dibromo-2α-(N,N-diethylaminomethyl) - 17α - ethyl - androstan-17β-ol-3-one, 2β,4α - dibromo - 2α - (N-ethyl-N-methyl-aminomethyl)-17β-trimethylacetyloxy - androstan-3-one, 2β,4α-dibromo-2α-(N,N - di - n - pyrrolidinomethyl-androstan-17β-ol-3-one, 2β,4α - dibromo - 17α - methyl-2α-(1-pyrrolidinomethyl)-androstan - 17β - ol - 3 - one, 2β,4α-dibromo - 17α - ethyl-2α-(1-pyrrolidinomethyl)-androstan-17β-ol-3-one, 2β,4α-dibromo - 17β - acetoxy - 2α - (1-pyrrolidinomethyl)-androstan - 3 - one, 2β,4α-dibromo-17β-propionyloxy - 2α - (1 - pyrrolidinomethyl)-androstan-3-one, 2β,4α - dibromo - 3,3 - ethylenedioxy-2α-(1-pyrrolidinomethyl)-androstan - 17β - ol, 2β,4α-dibromo-3,3-(1,2-propylenedioxy) - 2α - (1-pyrrolidinomethyl)-androstan-17β-ol, 2β,4α-dibromo - 2α - (1-piperidinomethyl)-androstan-17β-ol-3-one, 2β,4α - dibromo - 17α - methyl-2α-(1-piperidinomethyl)-androstan - 17β - ol - 3 - one, 2β,4α-dibromo-3,3-ethylenedioxy - 2α - (1 - piperidinomethyl)-androstan-17β-ol, 2β,4α-dibromo-2α-(N,N - hexamethyl-eneiminomethyl)-androstan-17β-ol-3-one and the like, as well as, for example, 2β,4α-dibromo-2α-(1-pyrrolidinomethyl-19-nor-androstan-17β-ol-3-one, 2β,4α-dibromo-2α-(1 - pyrrolidinomethyl)-androstan-11β,17β-diol - 3 - one, 2β,4α-dibromo - 9α - fluoro-17α-methyl-2α-(1-piperidinomethyl)-androstan-11β,17β-diol-3-one and the like, and acid addition salts of these compounds with inorganic acids, e.g. hydrochloric, sulfuric acid and the like, or organic carboxylic acids, e.g. acetic, tartaric, citric acid and the like, and the lower alkyl quarternary ammonium halides thereof, such as the methtochlorides, methobromides, methiodides, ethochlorides, ethobromides, ethiodides and the like, and the corresponding quaternary ammonium hydroxides.

These compounds may be prepared, for example, by reacting a 4α-halogeno-2α-tertiary amino-methyl-androstan-3-one compound, particularly a compound of the formula:

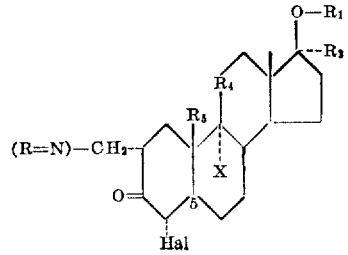

in which $R_1$, $R_2$, $R_4$, $R_5$, X, Hal and (R=N)— have the previously given meaning, and in which the hydrogen atom attached to the 5-position has preferably the α-configuration, a salt or a quaternary ammonium compound thereof with an equivalent amount of halogen, particularly bromine, and, if desired, carrying out the optional steps.

The halogenation, especially the bromination, reaction is performed under kinetically controlled condition, i.e. in the presence of a base, which is furnished by the starting material or may be added. The reaction is carried out as previously shown.

Also included within the scope of this invention are the 2-tertiary amino-methyl-Δ¹-androstene compounds previously described which may be represented for example by the formula:

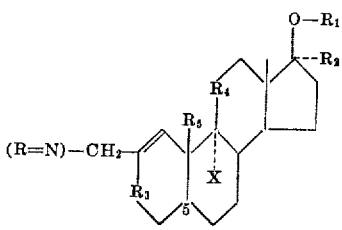

in which $R_1$, $R_2$, $R_3$, $R_4$, $R_5$, X and (R=N)— have the previously given meaning, and in which the hydrogen atom attached to the 5-position has preferably the α-configuration, salts or quaternary ammonium compounds thereof, particularly of compounds of the formula:

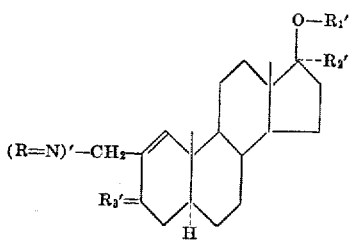

in which $R_1'$, $R_2'$, $R_3'$ and (R=N)'— have the previously given meaning, acid addition salts or lower alkyl quaternary ammonium compounds thereof. These compounds exhibit androgenic and/or anabolic activities and can, therefore, be used in lieu of known androgenic or anabolic agents, for example, in the treatment of menopausal disturbances, regeneration of tissue loss due to burns or protein loss following an operation or prolonged sickness and the like. Contrary to other androgenic and/or anabolic agents the compounds of the present invention form therapeutically acceptable acid addition salts, and are, therefore, better soluble.

These compounds may be represented, for example, by 2-(N,N-dimethylaminomethyl)-Δ¹-androsten-17β-ol-3-one,
2-(N,N-dimethylaminomethyl)-3,3-ethylene-dioxy-Δ¹-androsten-17β-ol,
2-(N,N-dimethylaminomethyl)-17β-propionyloxy-Δ¹-androsten-3-one,
2-(N,N-dimethylaminomethyl)-17α-methyl-Δ¹-androsten-17β-ol-3-one,
2-(N,N-diethylaminomethyl)Δ¹-androsten-17β-ol-3-one,
2-(N,N-diethylaminomethyl)-3,3-(1,2-propylenedioxy)-Δ¹-androsten-17β-ol-3-one,
2-(N,N-diethylaminomethyl)-17α-ethyl-Δ¹-androsten-17β-ol-3-one,
2-(N-ethyl-N-methyl-aminomethyl)-17β-trimethylacetyloxy-Δ¹-androsten-3-one,
2-(N,N-di-n-propylaminomethyl)-Δ¹-androsten-17β-ol-3-one,
2-(1-pyrrolidinomethyl)-Δ¹-androsten-17β-ol-3-one, 17α-methyl-2-(1-pyrrolidinomethyl-Δ¹-androsten-17β-ol-3-one,
17α-ethyl-2-(1-pyrrolidinomethyl)-Δ¹-androsten-17β-ol-3-one,
17β-acetoxy-2-(1-pyrrolidinomethyl-Δ¹-androsten-3-one,
17β-propionyloxy-2-(1-pyrrolidinomethyl)-Δ¹-androsten-3-one,
3,3-ethylenedioxy-2-(1-pyrrolidinomethyl)-Δ¹-androsten-17β-ol,
3,3-(1-proplenedioxy)-2-(1-pyrrolidinomethyl)-Δ¹-androsten-17β-ol,
2-(1-piperidinomethyl)-Δ¹-androsten-17β-ol-3-one,
17α-methyl-2-(1-piperidinomethyl)-Δ¹-androsten-17β-ol-3-one,
3,3-ethylenedioxy-2-(1-piperidinomethyl)-Δ¹-androsten-17β-ol,
2-(N,N-hexamethyleneiminomethyl)-Δ¹-androsten-17α-ol-one and the like, as well as, for example, 2-(1-pyrrolidinomethyl)-19-nor-Δ¹-androsten-17β-ol-3-one,
2-(1-pyrrolidinomethyl)-Δ¹-androsten-11β,17β-diol-3-one,
9α-fluoro-17α-methyl-2-(1-piperidinomethyl)-Δ¹-androsten-11β,17β-diol-3-one and the like, and acid addition salts of these compounds with inorganic acids, e.g. hydrochloric, sulfuric acid and the like, or organic carboxylic acids, e.g. acetic, tartaric, citric acid and the like, and the lower alkyl quaternary ammonium halides, thereof, such as the methochlorides, methobromides, methiodides, ethochlorides, ethobromides, ethiodides and the like, and the corresponding quaternary ammonium hydroxides.

They may be prepared from a 2β-halogeno-2α-tertiary amino-methyl-androstane compound by splitting off hydrogen halide, and, if desired, converting a resulting salt into the free compound, and/or, if desired, converting a free compound into a salt thereof, and/or, if desired, converting in a resulting compound a functional group into another functional group.

Removal of hydrogen halide, particularly hydrogen bromide, is carried out according to known dehydrohalogenation methods. It may be achieved, for example, with lithium chloride by heating a mixture of the starting material and the reagent in a suitable solvent, particularly in N,N-dimethylformamide and the like, to from about 80° to the boiling point of the solvent, preferably in the presence of an acid-neutralizing reagent, such as an alkali metal carbonate, e.g. lithium carbonate, sodium carbonate and the like. Another dehydrohalogenation procedure, which may be used whenever an oxo group is present in the 3-position of the starting material, involves formation of a hydrazone, for example, with 2,4-dinitro-phenyl-hydrazine; the hydrazone is then decomposed with simultaneous dehydrohalogenation, for example, by treatment with pyruvic acid and the like.

Also included within the scope of this invention are the 2-tertiary amino-methyl-Δ¹,⁴-androstadiene compounds, salts or quaternary ammonium compounds thereof, which compounds may be represented by the formula:

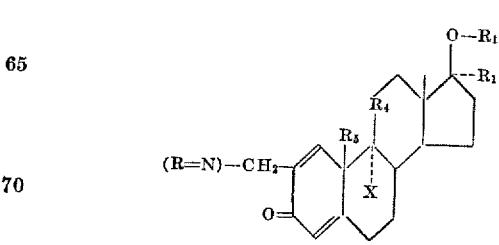

in which $R_1$, $R_2$, $R_4$, $R_5$, X and (R=N)— have the previously-given meaning, salts or quaternary ammonium compounds thereof. A preferred group of compounds is represented by the formula:

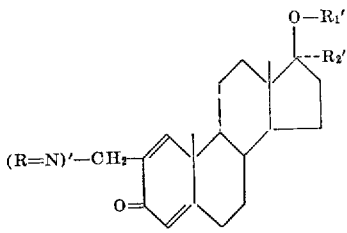

in which $R_1'$, $R_2'$ and $(R=N)'$ have the previously-given meaning, acid addition salts or lower alkyl quaternary ammonium compounds thereof.

These compounds exhibit androgenic and/or anabolic properties and can be used in an analogous manner as the 2-tertiary amino-methyl-$\Delta^1$-androstene compounds described hereinbefore, and may be represented, for example, by 2-(N,N-dimethylaminomethyl)-$\Delta^{1,4}$-androstadien-17β-ol-3-one,
2-(N,N-dimethylaminomethyl)-17β-propionyloxy-$\Delta^{1,4}$-androstadien-3-one,
2-(N,N-dimethylaminomethyl)-17α-$\Delta^{1,4}$-androstadien-17β-ol-3-one,
2-(N,N-diethylaminomethyl)-$\Delta^{1,4}$-androstadien-17β-ol-3-one,
2-(N,N-diethylaminomethyl)-17α-ethyl-$\Delta^{1,4}$-androstadien-17β-ol-3-one,
2-(N-ethyl-N-methyl-aminomethyl)-17β-trimethylacetyloxy-$\Delta^{1,4}$-androstadien-3-one,
2-(N,N-di-n-propylaminomethyl)-$\Delta^{1,4}$-androstadien-17β-ol-3-one,
2-(1-pyrrolidinomethyl)-$\Delta^{1,4}$-androstadien-17β-ol-3-one,
17α-methyl-2-(1-pyrrolidinomethyl)-$\Delta^{1,4}$-androstadien-17β-ol-3-one,
17α-ethyl-2-(1-pyrrolidinomethyl)-$\Delta^{1,4}$-androstadien-17β-ol-3-one,
17β-acetoxy-2-(1-pyrrolidinomethyl)-$\Delta^{1,4}$-androstadien-3-one,
17β-propionyloxy-2-(1-pyrrolidinomethyl)-$\Delta^{1,4}$-androstadien-3-one,
2-(1-piperidinomethyl)-$\Delta^{1,4}$-androstadien-17β-ol-3-one,
17α-methyl-2-(1-piperidinomethyl)-$\Delta^{1,4}$-androstadien-17β-ol-3-one,
2-(N,N-hexamethyleneiminomethyl)-$\Delta^{1,4}$-androstadien-17β-ol-3-one, and the like, as well as, for example, 2-(1-pyrrolidinomethyl)-19-nor-$\Delta^{1,4}$-androstadien-17β-ol-3-one,
2-(1-pyrrolidinomethyl)-$\Delta^{1,4}$-androstadien-11β,17β-diol-3-one,
9α-fluoro-17α-methyl-2-(1-piperidinomethyl)-$\Delta^{1,4}$-androstadien-11β,17β-diol-3-one and the like, and acid addition salts of these compounds with inorganic acids, e.g. hydrochloric, sulfuric acid and the like, or organic carboxylic acids, e.g. acetic, tartaric, citric acid and the like, and the lower alkyl quaternary ammonium halides, thereof, such as the methochlorides, methobromides, methiodides, ethochlorides, ethobromides, ethiodides and the like, and the corresponding quaternary ammonium hydroxides.

These compounds may be prepared by splitting off two mols of hydrogen halide in a 2β,4α-di-halogeno-2α-tertiary amino-methyl-androstane compound, and, if desired, carrying out the optional steps. The dehydrohalogenation procedure is carried out according to the previously described methods used for the removal of hydrogen halide.

Compounds of this invention, which exhibit useful pharmacological effects may be used as medicaments in the form of pharmaceutical preparations, which contain the new androstenes or the salts thereof in admixture with a pharmaceutical organic or inorganic, solid or liquid carrier suitable for enteral or parenteral administration. For making up the preparations there can be employed substances which do not react with the new compounds, such as water, gelatine, lactose, starches, stearic acid, magnesium stearate, stearyl alcohol, talc, vegetable oils, benzyl alcohols, gums, propylene glycol, polyalkylene glycols or any other known carrier for medicaments. The pharmaceutical preparations may be in the solid form, for example, as capsules, tablets, dragees and the like, or in liquid form, for example, as solutions, suspensions, emulsions and the like. If necessary, they may contain auxiliary substances, such as preserving, stabilizing, wetting, emulsifying agents and the like, salts for varying the osmotic pressure, buffers, etc. They may also contain, in combination, other therapeutically useful substances.

Depending on the conditions used, the compounds of this invention and the intermediates used in the manufacture are obtained in the form of the free bases or as the salts thereof. A salt may be converted into the free base, for example, by reaction with an aqueous basic reagent, such as an alkali metal hydroxide, e.g. lithium hydroxide, sodium hydroxide, potassium hydroxide and the like, an alkali metal carbonate, e.g. sodium or potassium carbonate or hydrogen carbonate and the like, ammonia, an ion exchange resin and the like. A free base may be converted into its acid addition salts by reaction with one of the inorganic or organic acids outlined hereinbefore, for example, by treating a solution of the base in an inert solvent such as a lower alkanol, e.g. methanol, ethanol, n-propanol, isopropanol and the like, an ether, e.g. diethyl ether, tetrahydrofuran and the like, a lower alkyl lower alkanoate, e.g. methyl acetate, ethyl acetate and the like, or any other suitable solvent or solvent mixture with the appropriate acid or a solution thereof.

Quaternary ammounium derivatives may be prepared from the tertiary bases according to known methods, for example by treatment with a reactive ester of a hydroxylated compound with a strong acid, particularly a mineral acid, e.g. hydrochloric, hydrobromic, hydriodic, sulfuric acid and the like, or with organic sulfonic acids, e.g. methane sulfonic, ethane sulfonic, 2-hydroxy-ethane sulfonic, benzene sulfonic, p-bromo-benzene sulfonic, p-toluene sulfonic acid and the like; the esters may be represented by lower alkyl halides, e.g. methyl, ethyl, n-propyl, isopropyl chloride, bromide, iodide and the like, phenyl-lower alkyl halides, e.g. benzyl chloride, benzyl bromide, benzyl iodide, 1-phenyl-ethyl bromide, 2-phenyl-ethyl-bromide and the like, di-lower alkyl sulfates, e.g. dimethyl sulfate, diethyl sulfate and the like, lower alkyl lower alkane sulfonates, e.g. methyl methane sulfonate, ethyl methane sulfonate, methyl ethane sulfonate and the like, lower alkyl p-toluene sulfonates, e.g. methyl benzene sulfonate, methyl p-toluene sulfonate and the like.

The quaternization reaction is carried out in an inert solvent, such as a lower alkanone, e.g. acetone and the like, a lower alkanol, e.g., methanol, ethanol and the like, a formamide, e.g. formamide, N,N-dimethylformamide and the like, if necessary, at an elevated temperature, and/or, under pressure.

Resulting quaternary ammonium compounds may be converted into corresponding quaternary ammonium hydroxides, for example, by reacting a quaternary ammonium halide with silver oxide, or a quaternary ammonium sulfate with barium hydroxide, by treating a quaternary ammonium salt with an anion exchanger, or by electrodialysis. For resulting quaternary ammonium hydroxide there may be prepared other quaternary ammonium salts by treatment with acids, such as, for example, those outlined hereinbefore. A quaternary ammonium compound may also be converted directly into another quaternary ammonium salt without the formation of the quaternary ammonium hydroxide; for example, a quaternary ammonium iodide may be reacted with freshly prepared silver chloride to yield the quaternary ammonium chloride, or a quaternary ammonium iodide may be converted into the corresponding chloride by treatment with hydrochloric acid in anhydrous methanol.

In the compounds of this invention, functional groups may be converted into other functional groups. Thus, acyloxy groups may be hydrolyzed into free hydroxyl groups, according to known methods, for example, by treatment with a basic hydrolysis reagent, e.g. aqueous sodium hydroxide and the like. Or, a free hydroxyl group may be esterified according to known methods, for example, by treatment with an organic carboxylic or sulfonic acid halide, particularly a corresponding chloride, in the presence of an organic base, e.g. pyridine and the like. Furthermore, a free hydroxyl group may be oxidized into an oxo group, for example, according to the Oppenauer oxidation procedure, e.g. by treatment with aluminum tert.-butoxide in the presence of acetone. An oxo group, in turn may be converted into a hydroxyl group by reduction, for example, by catalytic hydrogenation, e.g. treatment with hydrogen in the presence of a metal catalyst, e.g. Raney nickel and the like, the Meerwein-Ponndorf-Verley reduction, e.g. treatment with aluminum isopropoxide in the presence of isopropanol, or any other suitable method. The oxo group may also be converted into a functionally converted oxo group, particularly into a lower alkylenedioxy group, for example, by treatment with a lower alkylene glycol, e.g. ethylene glycol, in the presence of a trace of p-toluene sulfonic acid. Or, a functionally converted oxo group may be transformed into a free oxo group, for example, by treatment with an acid, e.g. acetic acid and the like.

The invention also comprises any modification of the process wherein a compound obtainable as an intermediate at any stage of the process is used as starting material and the remaining step(s) of the process is (are) carried out, as well as any new intermediates.

In the process of this invention such starting materials are preferably used which lead to final products mentioned in the beginning as preferred embodiments of the invention.

This is a continuation-in-part application of my application Serial No. 60,578, filed October 5, 1960, now abandoned.

The following examples are intended to illustrate the invention and are not to be construed as being limitations thereon. Temperatures are given in degrees centigrade.

*Example 1*

To a solution of 2.7 g. (0.00725 mol) of 2α-(1-pyrrolidinomethyl)-androstan-17β-ol-3-one in 30 ml. of carbon tetrachloride is added slowly and dropwise a solution of 1.16 g. (0.00725 mol) of bromine in 5 ml. of carbon tetrachloride while stirring. After the addition, the reaction mixture is triturated several times with a total of 600 ml. of diethyl ether. 0.6 g. of crude 2β-bromo-2α-(1-pyrrolidinomethyl)-androstan-17β-ol-3-one hydrobromide is filtered off and purified by recrystallization from acetone, M.P. 169°.

The starting material may be prepared as follows: A solution of 2.75 g. of androstan-17β-ol-3-one in 25 ml. of ethanol is treated with 1.07 g. of pyrrolidine hydrochloride and 2 ml. of a 37 percent aqueous solution of formaldehyde. The reaction mixture is allowed to stand for one week at room temperature, the solvent is removed under reduced pressure, and the residue is triturated with water. The aqueous filtrate is made basic with an aqueous sodium bicarbonate solution, the organic material is extracted with diethylether and the organic solution is dried over sodium sulfate. The diethyl ether solution is treated with a saturated solution of hydrogen chloride in ethyl acetate to yield 1.4 g. of the pure 2α-(1-pyrrolidinomethyl)-androstan-17β-ol-3-one hydrochloride, M.P. 198–200°, $[\alpha]_D^{27}=-0.17°$ (in chloroform), which is converted into the free base by treatment with aqueous ammonia.

The above starting material may also be prepared as follows: To a solution of 10 g. of 2-hydroxymethylene-androstan-17β-ol-3-one in 500 ml. of dry benzene is added 5.0 g. of pyrrolidine. The reaction mixture is refluxed for four hours, while removing the generated water in a water trap. The benzene is removed under reduced pressure and the residue is recrystallized from a mixture of ethyl acetate and ethanol to yield the yellow crystalline 2-(1-pyrrolidinomethylene)-androstan-17β-ol-3-one, M.P. 280–281°, $[\alpha]_D^{27}=-124.86°$ (in chloroform).

4.5 g. of the 2-(1-pyrrolidinomethylene)-androstan-17β-ol-3-one is dissolved in 100 ml. of tetrahydrofuran, and the solution is added to a suspension of 3.5 g. of lithium aluminum hydride in 200 ml. of diethylether. After refluxing for 3 hours, a saturated solution of sodium potassium tartrate is added slowly, the mixture is filtered and the filtrate was extracted with diethyl ether and methylene chloride. The combined organic extracts are dried over magnesium sulfate, the solvents are evaporated and the residue is taken up in a small amount of ethanol. The solution is treated with a saturated solution of hydrogen chloride in ethyl acetate, the resulting viscous material is triturated with ether and then recrystallized twice from a mixture of ethanol, diethyl ether and acetone to give 1 g. of 2α-(1-pyrrolidinomethyl)-androstan-17β-ol-3-one hydrochloride, M.P. 200°, which is identical with the compound prepared according to the previously described procedure.

A third procedure for the preparation of the starting material is carried out as follows: A total of 0.5 g. of 2α-(1-pyrrolidinomethyl)-testosterone is dissolved in a mixture of 12 ml. of dry dioxane and 6 ml. of dry diethyl ether. This solution is then added over a 10-minute period to a solution of 0.1 g. of lithium dissolved in 50 ml. of liquid ammonia. An additional 0.05 g. of lithium is added to maintain the blue color of the reaction mixture for an additional 30 minutes. The lithium amide formed is neutralized by the addition of 1.2 g. of ammonium chloride and the ammonia is allowed to evaporate. The residue is dissolved in chloroform, washed with water, dried over sodium sulfate and concentrated under reduced pressure. The resulting solid is dissolved in a small amount of ethyl alcohol and treated with a saturated solution of hydrogen chloride in ethyl acetate. A semi-crystalline substance is obtained which was recrystallized from a mixture of ethanol and diethyl ether to yield 0.09 g. of 2α-(1-pyrrolidinomethyl)-androstan-17β-ol-3-one hydrochloride, M.P. 198–200°; the product is identical in all respects with the above-prepared compound, and is converted into the free base, M.P. 152–153°, by treatment with aqueous ammonia.

*Example 2*

To a solution of 3.5 g. of 17β-propionyloxy-2α-(1-pyrrolidinomethyl)-androstan-3-one in 30 ml. of a 37 percent solution of hydrogen bromide in acetic acid is added slowly a solution of 1.28 g. of bromine in 10 ml. of acetic acid while stirring and maintaining a temperature of from 5° to 10°. After completing the addition, the reaction mixture is allowed to stand at room temperature for one hour and is then triturated with diethyl ether. The desired 4α-bromo-2α-(1-pyrrolidinomethyl)-androstan-17β-ol-3-one hydrobromide crystallizes, is filtered off and recrystallized from a mixture of methanol and diethyl ether, M.P. 200–201°, yield: 1.25 g.

*Example 3*

To a solution of 10.0 g. of 17β-propionyloxy-2α-(1-pyrrolidinomethyl)-androstan-3-one in 100 ml. of carbon tetrachloride is added 3.7 g. of bromine in 10 ml. of carbon tetrachloride. The reaction is carried out as shown in Example 1 to yield 6.0 g. of the 2β-bromo-17β-propionyloxy-2α-(1-pyrrolidinomethyl)-androstan-3-one hydrobromide which melts at 190–192° after recrystallization from hot acetone.

Example 4

To a solution of 0.2 g. of 17β-propionyloxy-2α-(1-pyrrolidinomethyl)-androstan-3-one methobromide in 10 ml. of acetic acid is added over a period of 30 minutes a total of 6.12 ml. of a bromination solution (prepared by dissolving 0.195 g. of sodium acetate in a solution of 1.0 g. of bromine in 100 ml. of acetic acid). The reaction mixture is allowed to stand overnight at room temperature and is then triturated with diethyl ether. The resulting precipitate is filtered off and recrystallized from a mixture of ethanol and diethyl ether to yield the 2β-bromo-2α-(1-pyrrolidinomethyl)-androstan - 17β - ol - 3-one methobromide which melts at 176–177°; yield: 0.07 g.

The starting material is prepared as follows: Through a solution of 2.0 g. of 17β-propionyloxy-2α-(1-pyrrolidinomethyl)-androstan-3-one in acetone is passed gaseous methyl bromide and the reaction mixture is allowed to stand overnight. The resulting precipitate is filtered off and washed with acetone to yield 17β-propionyloxy-2α-(1-pyrrolidinomethyl)-androstan - 3 - one methobromide, which melts at 230–232°; yield: 1.75 g.

Example 5

A solution of 0.1 g. of 4α-bromo-2α-(1-pyrrolidinomethyl)-androstan-17α-ol-3-one in acetone is treated with gaseous methyl bromide and then allowed to stand at room temperature. The precipitate is filtered off and washed with acetone to yield the 4α-bromo-2α-(1-pyrrolidinomethyl)-androstan - 17β - ol-3-one methobromide which melts at 200–202°; yield: 0.07 g.

Example 6

A solution of 3.0 g. of 17β-propionyloxy-2α-(1-pyrrolidinomethyl)-androstan-3-one in 20 ml. of glacial acetic acid is kept at 10° and a total of 1.72 g. of bromine is added slowly. A precipitate is formed, which is triturated with diethyl ether, collected and recrystallized from ethyl acetate to yield the 4α-bromo-17β-propionyloxy-2α-(1-pyrrolidinomethyl) - androstan - 3 - one hydrobromide, which melts at 190–192°.

Example 7

A mixture of 0.5 g. of 2β-bromo-17β-propionyloxy-2α-(1-pyrrolidinomethyl)-androstan - 3 - one hydrobromide, 1.1 g. of lithium carbonate and 0.83 g. of lithium chloride in 15 ml. of N,N-dimethylformamide is heated on a steam bath for two hours. After cooling the solid inorganic material is filtered off; the filtrate is diluted with 75 ml. of water and made basic to pH 7 to 8 by adding an aqueous solution of sodium carbonate. The organic material is extracted with ethyl acetate; the organic layer is separated and dried over magnesium sulfate and evaporated to dryness. The residue is recrystallized from acetone (or ethyl acetate) to yield the 17β-propionyloxy-2-(1-pyrrolidinomethyl)-$\Delta^1$-androstan-3-one, which melts at 210°.

Example 8

A mixture of 1.75 g. of 4α-bromo-2α-(1-pyrrolidinomethyl)-androstan-17β-ol-4-one hydrobromide, 0.525 g. of lithium carbonate and 0.44 g. of lithium chloride in 15 ml. of N,N-dimethylformamide is heated on the steam bath for two hours, and is then cooled and filtered. The filtrate is diluted with 50 ml. of water, and the solution is made basic to pH 7 to 8 with an aqueous sodium carbonate solution. The resulting precipitate is filtered off and recrystallized to yield the desired 2α-(1-pyrrolidinomethyl)-$\Delta^4$-androstan-17β-ol-3-one, which melts at 210–211°; yield: 0.25 g.

Example 9

By reacting the 4α-bromo-2α-(1-pyrrolidinomethyl)-androstan-17β-ol-3-one (obtained from the hydrobromide described in Example 3) with bromine under kinetically controlled conditions i.e. according to the procedure of Example 1, the 2β,4α-dibromo-2α-(1-pyrrolidinomethyl)-androstan-17β-ol-3-one hydrobromide is obtained.

Example 10

Treatment of a mixture of 2β,4α-dibromo-2α-(1-pyrrolidinomethyl)-androstan - 17β - ol-3-one hydrobromide with lithium chloride in the presence of lithium carbonate and N,N-dimethylformamide at an elevated temperature according to the procedure of Example 7 results in the formation of 2-(1-pyrrolidinomethyl)-$\Delta^{1,4}$-androstadien-17β-ol-3-one, which may be converted into the hydrochloride by treatment with hydrogen chloride gas in diethyl acetate.

Example 11

A solution of 2α-(N,N-dimethylamino methyl)-androstan-17β-ol-3-one in carbon tetrachloride, when reacted with an equivalent amount of bromine according to the kinetically controlled procedure of Example 1 yields the 2β - bromo-2α - (N,N-dimethylamino methyl)-androstan-17β-ol-3-one hydrobromide, which upon treatment with lithium chloride in the presence of lithium carbonate and N,N-dimethylformamide according to the method described in Example 8 furnishes the 2-(N,N-dimethylaminomethyl)-$\Delta^1$-androsten-17β-ol-3-one.

The starting material may be prepared as follows: A solution of 5.5 g. of 17β-hydroxy-5α-androstan-3-one in 50 ml. of ethanol is added 1.6 g. of dimethylamine hydrochloride and 2 ml. of a 37 percent aqueous solution of formaldehyde. The reaction mixture is allowed to stand for four hours at room temperature, the solvent is removed under reduced pressure and the residue is triturated with water. After filtration, the filtrate is made basic with an aqueous sodium bicarbonate solution and the resulting turbid solution is extracted with diethyl ether. The ether extract is dried over sodium sulfate and then treated with a saturated solution of hydrogen chloride in ethyl acetate. After standing for one week the 2α-(N,N - dimethylaminomethyl)-androstane-17β- ol-3-one hydrochloride monohydrate is obtained, M.P. 168°, $[\alpha]_D^{25} = +5.42°$ (in chloroform); yield: 30 percent. The salt is converted into the free base by treatment with aqueous ammonia.

Example 12

A solution of 2α-(N,N-dimethylaminomethyl)-androstan 17β-ol-3-one in a 37 percent solution hydrogen bromide in acetic acid, when reacted with bromine according to the procedure described in Example 2, yields the 4α - bromo - 2α-(N,N-dimethylaminoethyl)-androstan-17β-ol-3-one hydrobromide. The latter is dehydrobrominated to the 2α-(N,N-dimethylaminomethyl)-$\Delta^4$-androstan-17β-ol-3-one as described in Example 8, or it can be further brominated according to the kinetically controlled bromination method described in Examples 1 and 9 to the 2β,4α-dibromo-2α-(N,N-dimethylaminomethyl)-androstan-17β-ol-3-one, which is then dehydrobrominated to the desired 2-(N,N-dimethylaminomethyl)-$\Delta^{1,4}$-androstadien-17β-ol-3-one as described in Example 10.

What is claimed is:

1. 2β - bromo - 2α-(1-pyrrolidinomethyl)-androstan-17β-ol-3-one.

2. 2β - bromo - 2α-(1-pyrrolidinomethyl)-androstan-17β-ol-3-one hydrobromide.

3. 2β - bromo - 17β-propionyloxy-2α-(1-pyrrolidinomethyl)-androstan-3-one.

4. 2β - bromo - 17β-propionyloxy-2α-(1-pyrrolidinomethyl)-androstan-3-one hydrobromide.

5. Lower alkyl quaternary ammonium halides of 2β-bromo-17β-propionyloxy-2α-(1 - pyrrolidinomethyl)-androstan-3-one.

6. 2β - bromo - 17β-propionyloxy-2α-(1-pyrrolidinomethyl)-androstan-3-one methobromide.

7. 4α - bromo - 2α-(1-pyrrolidinomethyl)-androstan-17β-ol-3-one.

8. 4α - bromo - 2α-(1-pyrrolidinomethyl)-androstan-17β-ol-3-one-hydrobromide.

9. Lower alkyl quaternary ammonium halides of 4α-bromo-2α-(1-pyrrolidinomethyl)-androstan-17β-ol-3-one.

10. 4α - bromo - 2α-(1-pyrrolidinomethyl)-androstan-17β-ol-3-one methobromide.

11. 4α - bromo - 17β-propionyloxy-2α-(1-pyrrolidinomethyl)-androstan-17β-ol-3-one.

12. 2β,4α - dibromo - 2α-(1-pyrrolidinomethyl)-androstan-17β-ol-3-one.

13. 2β,4α - dibromo - 2α-(1-pyrrolidinomethyl)-androstan-17β-ol-3-one hydrobromide.

14. 2 - (1-pyrrolidinomethyl)-Δ¹-androstan-17β-ol-one.

15. 2 - (1-pyrrolidinomethyl)-Δ¹,⁴-androstadien-17β-ol-3-one.

16. A member selected from the group consisting of a compound having one of the formulae:

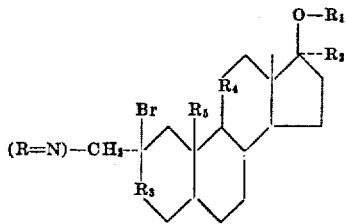

and

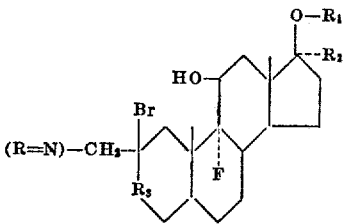

in which $R_1$ stands for a member selected from the group consisting of hydrogen and the acyl radical of an organic acid, $R_2$ stands for a member selected from the group consisting of hydrogen and an aliphatic hydrocarbon radical, $R_3$ is a member selected from the group consisting of carbonyl, lower alkylene-dioxy-methylene, hydroxy-methylene and acylated hydroxy-methylene, $R_4$ stands for a member selected from the group consisting of methylene, carbonyl, hydroxy-methylene and acylated hydroxy-methylene, $R_5$ is a member selected from the group consisting of hydrogen and methyl, the group (R=N)— stands for a member selected from the group consisting of N,N-di-lower alkyl-amino, N-cycloalkyl-N-lower alkyl-amino, N-lower alkyl-N-phenyl-lower alkyl-amino, N-hydroxy-lower alkyl-N-lower alkyl-amino, N,N-di-hydroxy-lower alkyl-amino, N,N-alkylene-imino, N,N-oxa-alkylene-imino, N,N-thia-alkylene-imino and N,N-aza-alkylene-imino, an acid addition salt and a quaternary ammonium compound thereof.

17. A member selected from the group consisting of a compound having one of the formulae:

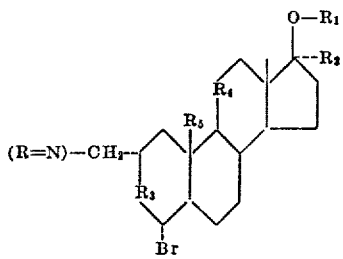

and

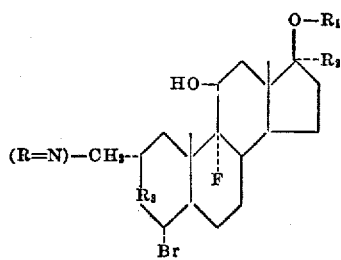

in which $R_1$ stands for a member selected from the group consisting of hydrogen and the acyl radical of an organic acid, $R_2$ stands for a member selected from the group consisting of hydrogen and an aliphatic hydrocarbon radical, $R_3$ is a member selected from the group consisting of carbonyl, lower alkylene - dioxy - methylene hydroxy-methylene and acylated hydroxy-methylene, $R_4$ stands for a member selected from the group consisting of methylene, carbonyl, hydroxy-methylene and acylated hydroxy-methylene, $R_5$ is a member selected from the group consisting of hydrogen and methyl, the group (R=N)— stands for a member selected from the group consisting of N,N-di-lower alkyl-amino, N-cycloalkyl-N-lower alkyl-amino, N-lower alkyl-N-phenyl-lower alkyl-amino, N-hydroxy-lower alkyl-N-lower alkyl-amino, N,N-di-hydroxy-lower alkyl-amino, N,N-alkylene-imino, N,N-oxa-alkylene-imino, N,N-thia-alkylene-imino and N,N-aza-alkylene-imino, an acid addition salt thereof and a quaternary ammonium compound thereof.

18. A member selected from the group consisting of a compound having one of the formulae:

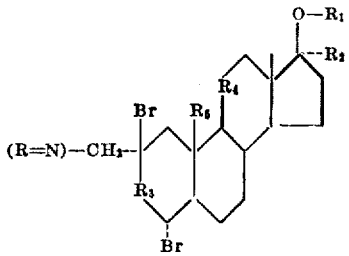

and

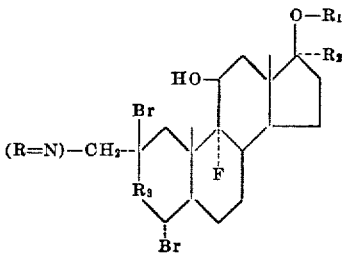

in which $R_1$ stands for a member selected from the group consisting of hydrogen and the acyl radical of an organic acid, $R_2$ stands for a member selected from the group consisting of hydrogen and an aliphatic hydrocarbon radical, $R_3$ is a member selected from the group consisting of carbonyl, lower alkylene-dioxy-methylene, hydroxy-methylene and acylated hydroxy-methylene, $R_4$ stands for a member selected from the group consisting of methylene, carbonyl, hydroxy-methylene and acylated hydroxy-methylene, $R_5$ is a member selected from the group consisting of hydrogen and methyl, the group (R=N)— stands for a member selected from the group consisting of N,N-di-lower alkyl-amino, N-cycloalkyl-N-lower alkyl-amino, N-lower alkyl-N-phenyl-lower alkyl-amino, N-hydroxy-lower alkyl-N-lower alkyl-amino, N,N-di-hydroxy-lower alkyl-amino, N,N-alkylene-imino, N,N-oxa-alkylene-imino, N,N-thia-alkylene-imino and N,N-aza-alkylene- 19. A member selected from the group consisting of a compound having one of the formulae:

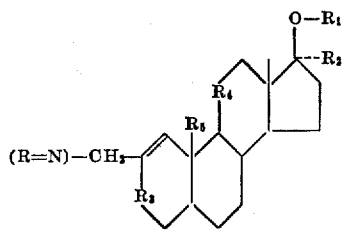

and

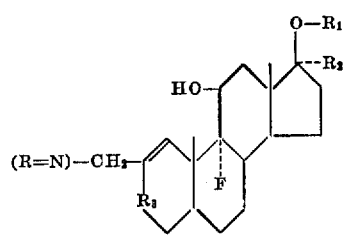

in which $R_1$ stands for a member selected from the group consisting of hydrogen and the acyl radical of an organic acid, $R_2$ stands for a member selected from the group consisting of hydrogen and an aliphatic hydrocarbon radical, $R_3$ is a member selected from the group consisting of carbonyl, lower alkylene-dioxy-methylene, hydroxy-methylene and acylated hydroxy-methylene, $R_4$ stands for a member selected from the group consisting of methylene, carbonyl, hydroxy-methylene and acylated hydroxy-methylene, $R_5$ is a member from the group consisting of hydrogen and methyl, and the group $(R=N)-$ stands for a member selected from the group consisting of N,N-di-lower alkyl-amino, N-cycloalkyl-N-lower alkyl-amino, N-lower alkyl-N-phenyl-lower alkyl-amino, N-hydroxy-lower alkyl-N-lower alkyl-amino, N,N-di-hydroxy-lower alkyl-amino, N,N - alkylene - imino, N,N-oxa-alkylene-imino, N,N-thia-alkylene-imino and N,N-aza-alkylene-imino, an acid addition salt thereof and a quaternary ammonium compound thereof.

20. A member selected from the group consisting of a compound having one of the formulae:

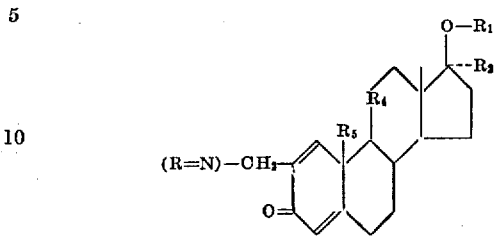

and

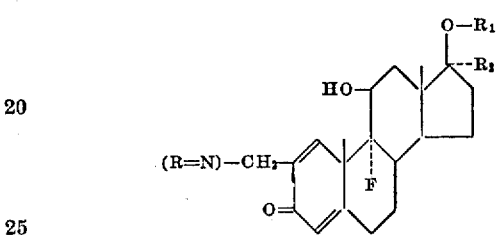

in which $R_1$ stands for a member selected from the group consisting of hydrogen and the acyl radical of an organic acid, $R_2$ stands for a member selected from the group consisting of hydrogen and an aliphatic hydrocarbon radical, $R_4$ stands for a member selected from the group consisting of methylene, carbonyl, hydroxy-methylene and acylated hydroxy-methylene, $R_5$ is a member selected from the group consisting of hydrogen and methyl, and the group $(R=N)-$ stands for a member selected from the group consisting of N,N-di-lower alkyl-amino, N-cycloalkyl-N-lower alkyl-amino, N-lower alkyl-N-phenyl-lower alkyl-amino, N-hydroxy-lower alkyl-N-lower alkyl-amino, N,N-di-hydroxy-lower alkyl-amino, N,N-alkylene-imino, N,N-oxa-alkylene-imino, N,N-thia-alkylene-imino and N,N-aza-alkylene-imino, and acid addition salt thereof and a quaternary ammonium compound thereof.

No references cited.

UNITED STATES PATENT OFFICE

CERTIFICATE OF CORRECTION

Patent No. 3,092,621                      June 4, 1963

George De Stevens

It is hereby certified that error appears in the above numbered patent requiring correction and that the said Letters Patent should read as corrected below.

Column 17, line 15, for "ol-one" read -- ol-3-one --; column 18, line 19, for "-methylene hydroxy-" read -- -methylene, hydroxy- --.

Signed and sealed this 5th day of May 1964.

(SEAL)
Attest:
ERNEST W. SWIDER

Attesting Officer

EDWARD J. BRENNER
Commissioner of Patents